Nov. 1, 1949     W. H. NORDENSON     2,486,970
REVERSIBLE WHEEL
Filed Nov. 14, 1946                                2 Sheets-Sheet 1

INVENTOR
W. H. Nordenson
BY
ATTORNEYS

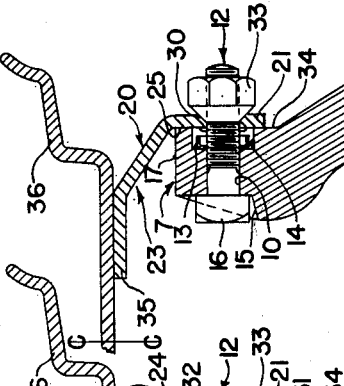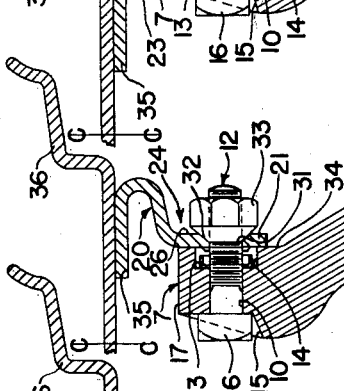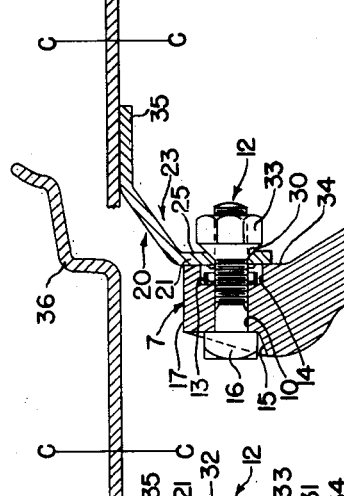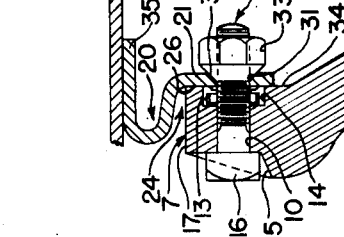

Patented Nov. 1, 1949

2,486,970

UNITED STATES PATENT OFFICE 2,486,970

REVERSIBLE WHEEL

Willard H. Nordenson, Rock Island, Ill., assignor to Deere Manufacturing Co., a corporation of Iowa Application November 14, 1946, Serial No. 709,690

2 Claims. (Cl. 301—9)

The present invention relates generally to wheels and more particularly to pressed metal wheels of the reversible type and has for its principal object the provision of a reversible wheel which allows several different axial positions of the rim with respect to the hub without reversing the wheel and which is, none the less, simple to construct. A further object is to provide a wheel which allows several more different axial positions of the rim with respect to the hub by reversing the wheel.

As is well known to those skilled in the art, wheels of the above-mentioned type find wide usage in form implements, such as the general purpose tractor. When using a tractor for many purposes, one often finds it desirable to be able to change the tread of the tires so as to be able to straddle furrows or run between rows of crops.

It is the object of the present invention to provide a wheel which may be axially adjusted, but which is more easily constructed than those heretofore known in the art.

In order to obtain the desired results, the present invention contemplates the use of a pressed metal wheel body or rim having a supporting zone indented alternately in opposite directions, with a bolt hole in each indenture. By this means two sets of bolt holes are provided, each set lying in a plane which is axially offset from the plane of the other set. By fastening the wheel body to the hub with one set of holes, a different axial position of the wheel body is obtained than would be obtained by using the other set of holes.

These and other objects and advantages of my invention will be apparent to those skilled in the art after a consideration of the following description, in which reference is had to the drawings appended hereto, in which:

Figure 3 is a fragmentary sectional view drawn to enlarged scale, taken along a radially extending plane passing through the wheel, showing the rim in innermost position with respect to the hub.

Figure 4 is similar to Figure 3 except that the wheel body is fastened to the hub by the other set of holes, placing the rim in the intermediate inner position.

Figure 5 is similar to Figure 4 except that the wheel has been reversed, placing the wheel in intermediate outer position.

Figure 6 is similar to Figure 3 except that the wheel has been reversed, placing the rim in outermost position.

Figure 1:
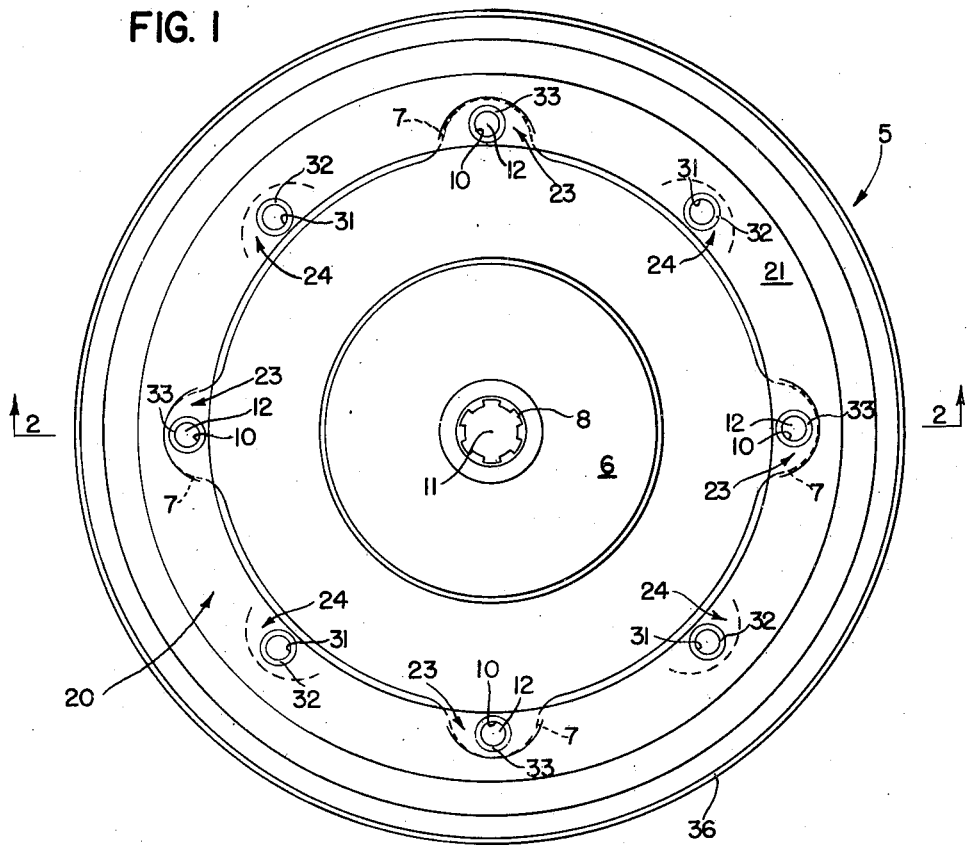
Figure 1 is a front elevational view of the hub, wheel body, and rim of a wheel embodying the present invention.

Referring now to the drawings, the wheel is indicated in its entirety by the reference numeral 5 and comprises a cast hub 6 splined on an axle 8 and having radially extending projections 7 having radial supporting faces 34 lying in a common radial plane. The projections 7 are provided with openings 10 equally spaced from the axis 11 of the wheel 5. A bolt 12 is passed through each opening 10 and is secured therein by a retaining nut 13 disposed in a recess 14 in the projection 7. A seat 15 is cut in the rear of the projection 7 to receive the square head 16 of the bolt 12 and to hold the latter against rotation.

Figure 2:
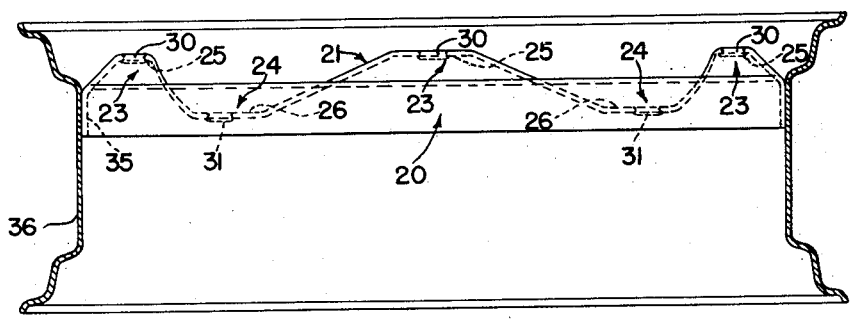
Figure 2 is a bottom view of the wheel body and rim with the rim being cut away to disclose the wheel body.

The outer extremities 17 of the projection 7 are rounded to conform generally to the peripheries of the inner bearing surfaces or radial faces 25 and 26 of mounting portions or elements in the form of spaced indentures 23, 24, which extend alternately in opposite directions, respectively, in the annular supporting zone 21 of a wheel body, indicated in its entirety by the reference numeral 20, being preferably integral parts of a circumferentially extending sinuous flange as best shown in Figure 2.

Each set of indentures 23, 24 contains a corresponding set of bolt holes 30, 31, respectively, which bolt openings are provided with conical seating surfaces 32. As is best shown in Figure 2, each set of mounting elements has its plurality of supporting faces lying in a common radial plane which is axially displaced from the radial plane of a plurality of radial supporting faces for the other set of mounting elements.

To attach the wheel body 20 to the hub 6, the former is placed adjacent the outer faces 34 of the projections 7 with the ends of the bolts 12 projecting through one of the sets of openings in the supporting zone 21. In this position, the wheel body 20 is fastened by means of hexagonal nuts 33, as shown in Figures 3 through 6 and it will be seen that the unused set of mounting elements is out of register with the projections 7. It should be further noted that the radial and circumferential extent of each of the unused mounting elements are respectively less than the corresponding dimensions of the spaces between the projections 7 so that the rim may be shifted axially and then angularly to provide two axially offset positions thereof on the hub.

A peripheral axially extending flange 35 comprises the outer portion of the wheel body 20, and a rim 36 is mounted on the flange radially outwardly of the latter and preferably welded thereto. As is best shown in Figure 2, the radial faces both sets of mounting elements 23 and 24 lie in planes disposed on the same side of the bisecting plane of revolution C—C of the rim 36. Therefore, two positions of the rim with respect to the hub are obtained in each of the two relatively reversed positions of the wheel, providing for a total of four positions of adjustment.

Figures 3 to 6 illustrate the means for obtaining the different adjustments from innermost position to outermost position, respectively.

To arrive at the connection shown in Figure 4 from the innermost position shown in Figure 3, the wheel body 20 and rim 36 are detached from the bolts 12 securing them to the hub 6 and rotated angularly with respect to the hub through forty-five degrees. This brings the other set of indentures 24 with their corresponding bolt holes 31 into coincidence with the projections 7, and the wheel body is fastened in place again by means of nuts 33.

The connection of Figure 5 is obtained by fastening the wheel body to the projections using the same set of holes that were used in Figure 4, but with the wheel in the other relatively reversed position.

The connection shown in Figure 6 is obtained by rotating the wheel body 20 angularly with respect to the hub through forty-five degrees from the connection of Figure 5, thus bringing the set of indentures 23 with their corresponding bolt holes 30 into coincidence with the projections 7, and fastening the wheel body 20 to the hole 6 by means of the bolts 12 and the nuts 33.

I claim:

1. A wheel, comprising: a hub part having radially outwardly directed projections equally spaced circumferentially and having radial supporting faces lying in a common radial plane; a rim part, including radially inwardly directed portions providing a first set of mounting elements the same in number and circumferential spacing as the hub projections and having radial supporting faces lying in a common radial plane and cooperative with the supporting faces of the hub projections to mount the rim part in a first position on the hub part; and means on the rim part including other radially inwardly directed portions providing a second set of mounting elements the same in number and circumferential spacing as the hub projections but angularly offset with respect to the first set to register with the spaces between the hub projections when the rim is mounted on the hub in its first position, and having radial supporting faces lying in a common radial plane that is offset axial from the plane of the supporting faces of the first set, and the radial and circumferential extent of said second set of mounting elements being respectively less than the radial and circumferential extent of the spaces between the hub projections for passing through said spaces to provide for shifting the rim axially and angularly to mount same in a second position on the hub part by means of the second set of mounting elements.

2. The invention defined in claim 1, further characterized in that: the first and second sets of mounting elements are integral parts of a radially inwardly directed flange extending sinuously and circumferentially about and joined to the inner periphery of the rim.

WILLARD H. NORDENSON.

REFERENCES CITED

The following references are of record in the file of this patent:

UNITED STATES PATENTS

| Number | Name | Date |
|---|---|---|
| 1,230,616 | Stevenson | June 19, 1917 |
| 2,291,156 | Heesch et al. | July 28, 1942 |
| 2,424,106 | Martens | July 15, 1947 |